(12) United States Patent
Kallevig

(10) Patent No.: US 8,528,915 B2
(45) Date of Patent: Sep. 10, 2013

(54) RIDER PLATFORM FOR SELF-PROPELLED VEHICLE

(76) Inventor: Bruce E. Kallevig, Monticello, MN (US)

( * ) Notice: Subject to any disclaimer, the term of this patent is extended or adjusted under 35 U.S.C. 154(b) by 59 days.

(21) Appl. No.: 13/329,968

(22) Filed: Dec. 19, 2011

(65) Prior Publication Data

US 2012/0205883 A1 Aug. 16, 2012

Related U.S. Application Data

(63) Continuation of application No. 11/222,279, filed on Sep. 8, 2005, now Pat. No. 7,458,588, which is a continuation of application No. 12/323,138, filed on Nov. 25, 2008, now Pat. No. 8,079,605.

(60) Provisional application No. 60/609,206, filed on Sep. 10, 2004.

(51) Int. Cl.
*B62D 63/06* (2006.01)

(52) U.S. Cl.
USPC ............................... 280/32.7; 280/727

(58) Field of Classification Search
USPC .............................. 280/32.7, 166, 288.4, 727
See application file for complete search history.

(56) References Cited

U.S. PATENT DOCUMENTS

| 3,485,314 A | 12/1969 | Herr |
| 3,913,811 A | 10/1975 | Spencer |
| 4,096,920 A | 6/1978 | Heyn |
| 4,750,578 A | 6/1988 | Brandenfels |
| 4,989,351 A | 2/1991 | Shear |
| 5,117,944 A | 6/1992 | Hurtevent |
| 5,413,364 A | 5/1995 | Hafendorfer |
| 5,577,744 A | 11/1996 | Parks |
| 5,584,493 A | 12/1996 | Demski et al. |
| 5,653,466 A | 8/1997 | Berrios |
| 5,697,623 A | 12/1997 | Bermes et al. |
| 5,809,756 A | 9/1998 | Scag et al. |
| 5,882,020 A | 3/1999 | Velke |
| 5,882,022 A | 3/1999 | Convertini et al. |
| 5,909,887 A | 6/1999 | Hobrath |
| 5,927,730 A | 7/1999 | Sattler |
| 5,947,505 A | 9/1999 | Martin |
| 6,336,517 B1 | 1/2002 | Cheng |
| 6,422,634 B2 | 7/2002 | Lundh |
| 6,443,252 B1 | 9/2002 | Andes |
| 6,485,036 B1 | 11/2002 | Bricko |
| 6,488,291 B1 | 12/2002 | Bellis |
| 6,497,422 B1 | 12/2002 | Bellis, Jr. |
| 6,612,596 B2 | 9/2003 | Jeon et al. |
| 7,004,272 B1 | 2/2006 | Brown et al. |

(Continued)

FOREIGN PATENT DOCUMENTS

| EP | 0466065 | 7/1991 |
| EP | 0485257 | 10/1991 |

(Continued)

*Primary Examiner* — Katy M Ebner
(74) *Attorney, Agent, or Firm* — Dicke, Billig & Czaja PLLC

(57) ABSTRACT

A self-propelled vehicle comprises a frame and a platform pivotally mountable to a rear portion of the vehicle frame. The platform is pivotally movable between a first position in which the platform extends generally horizontally from the rear portion of the frame to support a rider during operation of the vehicle, and a second position in which the platform is removably secured in a generally upright position adjacent the rear portion of the frame to enable walk-behind operation of the vehicle.

20 Claims, 12 Drawing Sheets

(56) References Cited

U.S. PATENT DOCUMENTS

| | | |
|---|---|---|
| 7,114,736 B2 | 10/2006 | Stodola et al. |
| 7,300,061 B1 | 11/2007 | Omstead |
| 7,527,285 B2 | 5/2009 | Vachal |
| 2001/0026055 A1 | 10/2001 | Havener |
| 2003/0084653 A1 | 5/2003 | Velke et al. |
| 2004/0093840 A1 | 5/2004 | Velke et al. |
| 2004/0145134 A1 | 7/2004 | Bares |

FOREIGN PATENT DOCUMENTS

| | | |
|---|---|---|
| EP | 0884218 | 12/1998 |
| EP | 1172285 | 1/2001 |
| GB | 1346032 | 2/1974 |
| JP | 2002 145128 | 5/2002 |
| WO | 03034968 | 1/2003 |

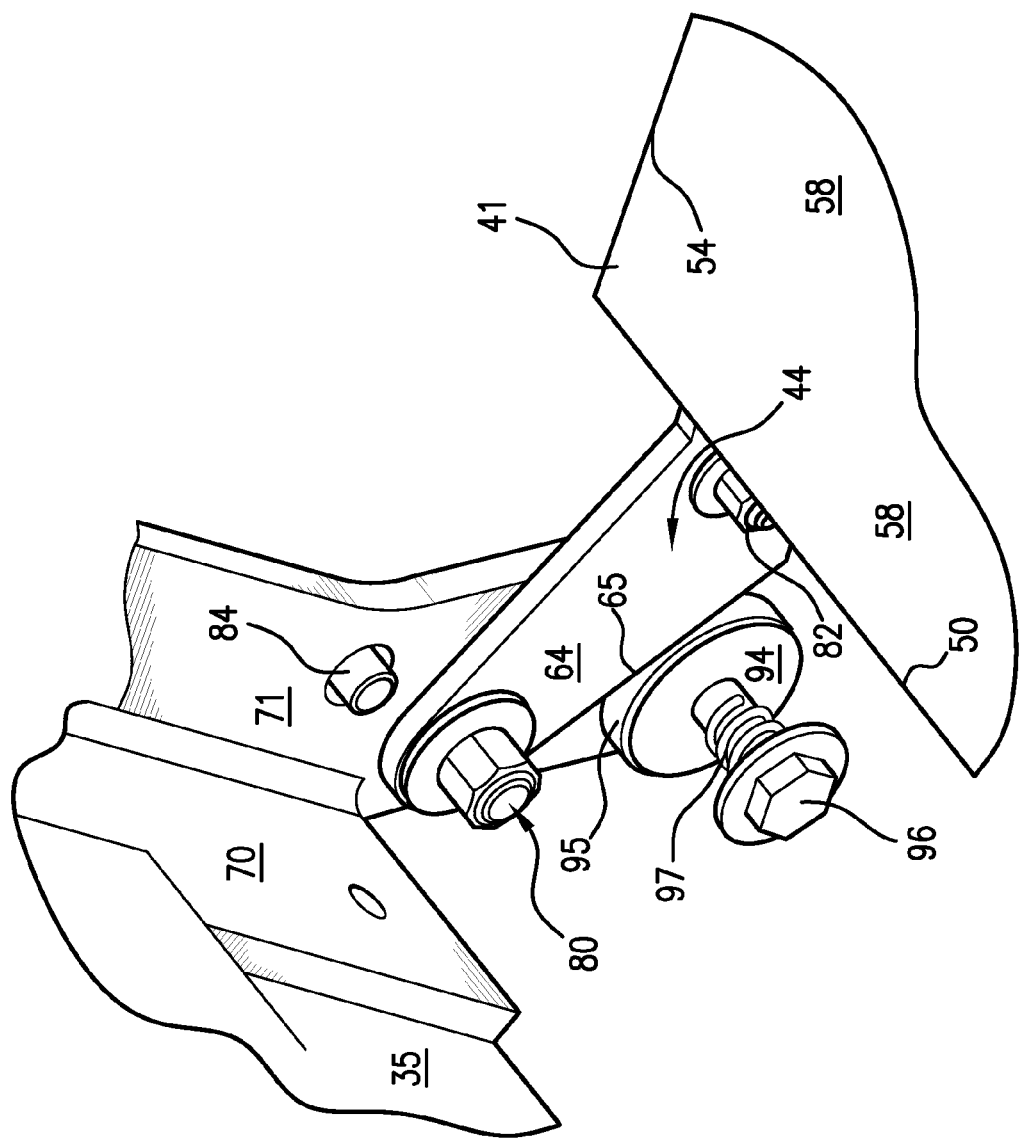

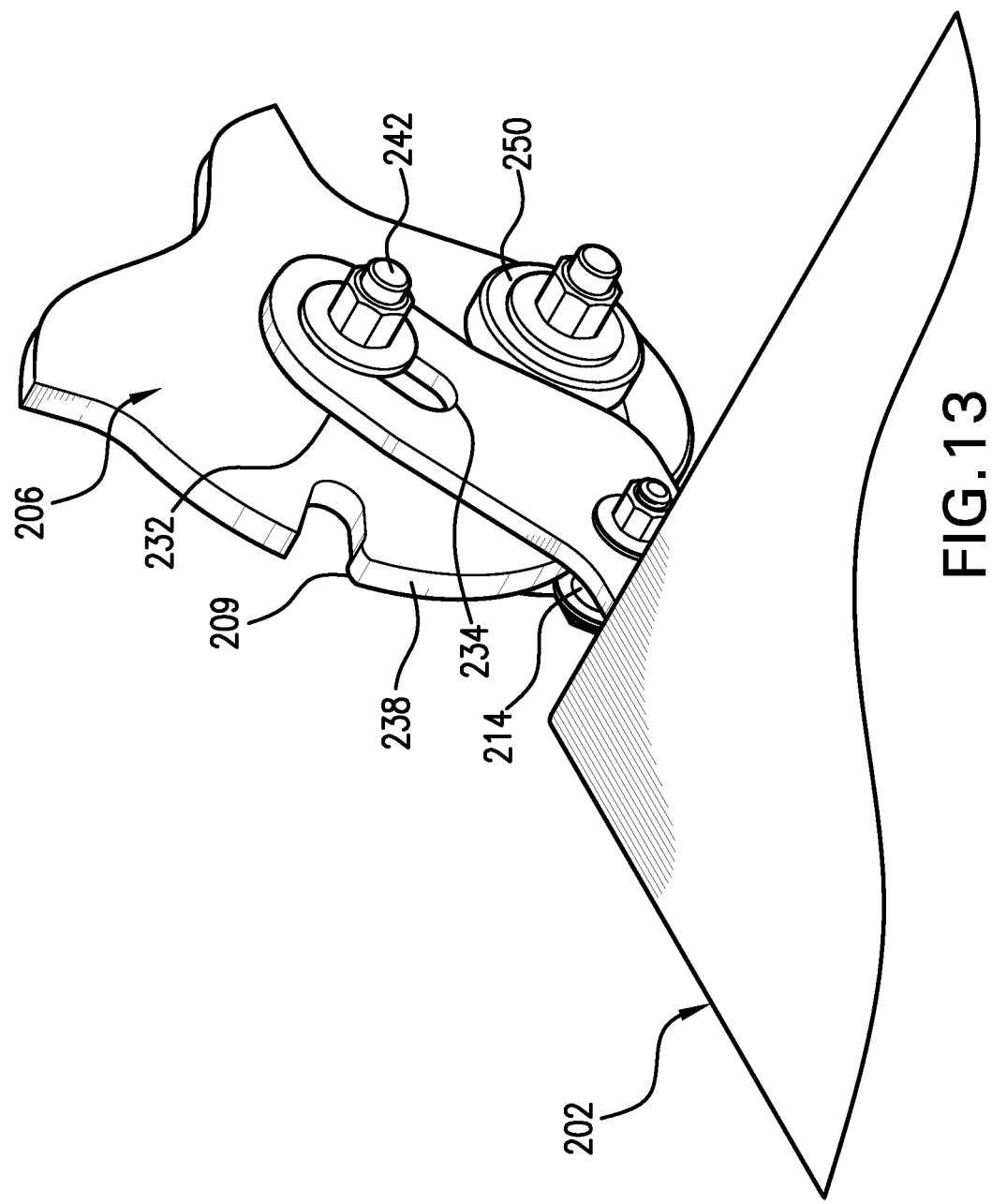

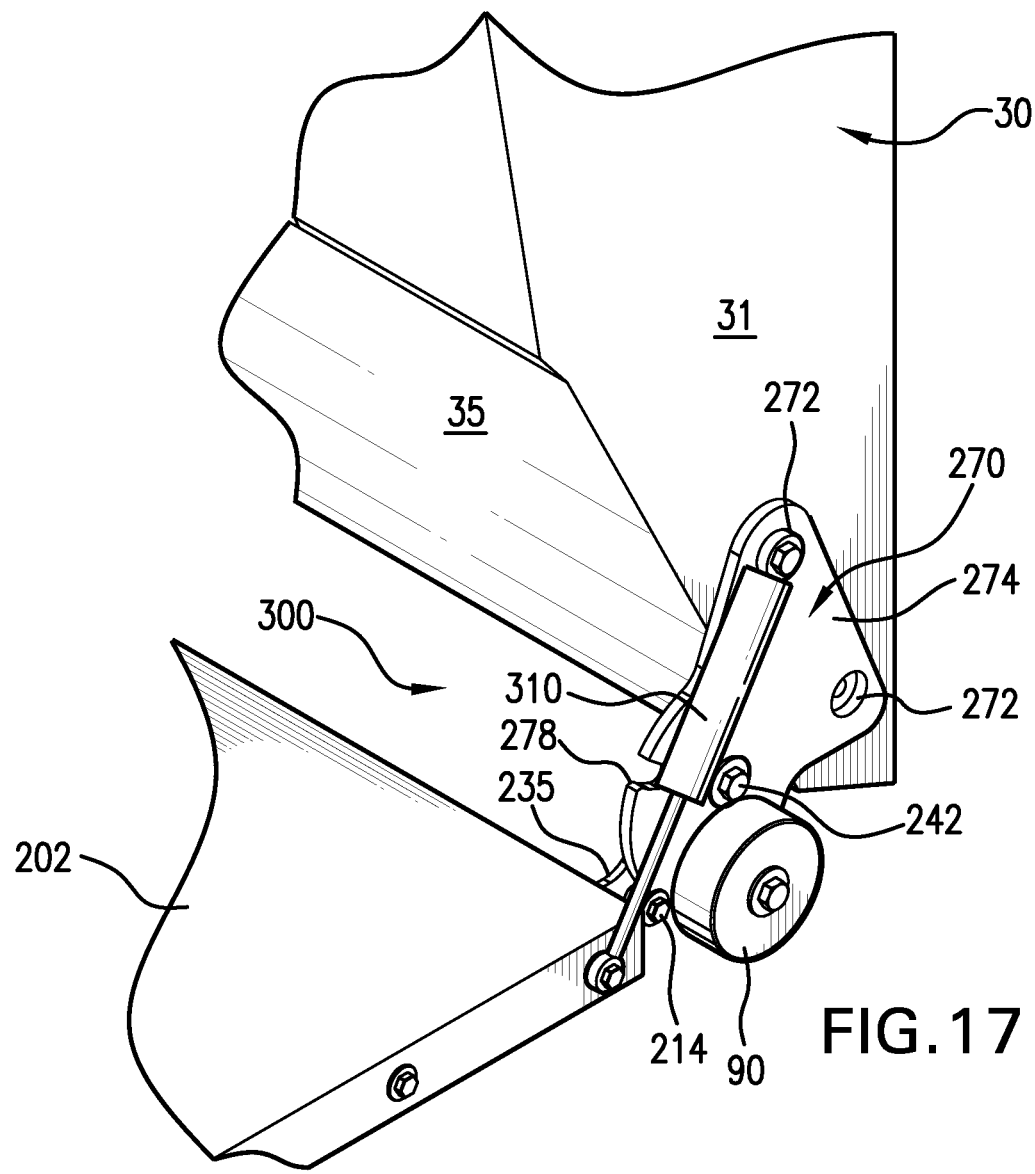

RIDER PLATFORM FOR SELF-PROPELLED VEHICLE

CROSS-REFERENCE TO RELATED APPLICATIONS

This application is a continuation of Provisional U.S. Patent Application Ser. No. 60/609,206, entitled "RIDER PLATFORM FOR SELF-PROPELLED VEHICLE," having a filing date of Sep. 10, 2004, U.S. patent application Ser. No. 11/222,279, entitled "RIDER PLATFORM FOR SELF-PROPELLED VEHICLE" having a filing date of Sep. 8, 2005, issued as U.S. Pat. No. 7,458,588 on Dec. 2, 2008, and U.S. patent application Ser. No. 12/323,138, entitled "RIDER PLATFORM FOR SELF-PROPELLED VEHICLE" having a filing date of Nov. 25, 2008, all of which are incorporated herein by reference.

BACKGROUND

Skid steer loaders have become common in construction and materials handling because of their relatively small size, which lends great versatility and maneuverability. However, in some instances, even these skid steer loaders are too large. Accordingly, a smaller version of these loaders has been developed, which are generally known as self-propelled utility vehicles as well as walk-behind loaders, compact utility loaders, or mini skid steer loaders. These self-propelled vehicles are narrower, and more nimble, allowing the operator to negotiate tighter spaces. In these vehicles, instead of the operator sitting in the vehicle in a seat, the operator walks behind the loader and guides the loader with hand controls located at a rear of the loader. With the controls, the operator controls movement of the loader as well as operation of any attachments such as a loader, auger, bucket, etc. These walk-behind loaders also permit quick access and exit from control of the loader, since the operator need not sit or stand in an enclosure of the loader to operate the loader.

However, since the operator no longer rides on the loader, the operator may be forced to walk through substances, such as mud, dirt, or other materials over which the loader travels. In addition, when moving over uneven terrain or steep terrain, the operator is required to maintain stable footing and exert energy to keep up with the loader. This situation can impair the operator's ability to maintain their hands and arms at the controls of the loader, thereby diminishing the function of the self-propelled loader. Fatigue caused by this constant walking also can further impair hand control of the loader in a walk-behind position.

For these reasons, neither conventional skid-steer loaders nor conventional self-propelled utility vehicles meet all the challenges faced by operators of these vehicles.

SUMMARY

A self-propelled vehicle comprises a frame and a platform pivotally mountable to a rear portion of the vehicle frame. The platform is pivotally movable between a first position in which the platform extends generally horizontally from the rear portion of the frame to support a rider during operation of the vehicle, and a second position in which the platform is removably secured in a generally upright position adjacent the rear portion of the frame to enable walk-behind operation of the vehicle.

BRIEF DESCRIPTION OF THE DRAWINGS

FIG. 8 is enlarged perspective view of a pivot mechanism and stop mechanism of a platform system, according to an embodiment of the present invention.

FIG. 13 is an enlarged perspective view of a pivot mechanism and a stop mechanism of the embodiment of FIG. 12, according to an embodiment of the present invention.

FIG. 17 is a perspective view of a platform system, according to another embodiment of the present invention.

DETAILED DESCRIPTION

In the following detailed description, references made to the accompanying drawings, which form a part hereof, and which is illustrated by way of illustrations specific embodiments in which the invention may be practiced. In this regard, directional terminology, such as "front," "back," etc., is used with reference to the orientation of the figures(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention enable convertible use of self-propelled vehicles, such as mini skid steer loaders or compact utility loaders, in a walk-behind mode or in a ride-on-platform mode.

Figure 1:
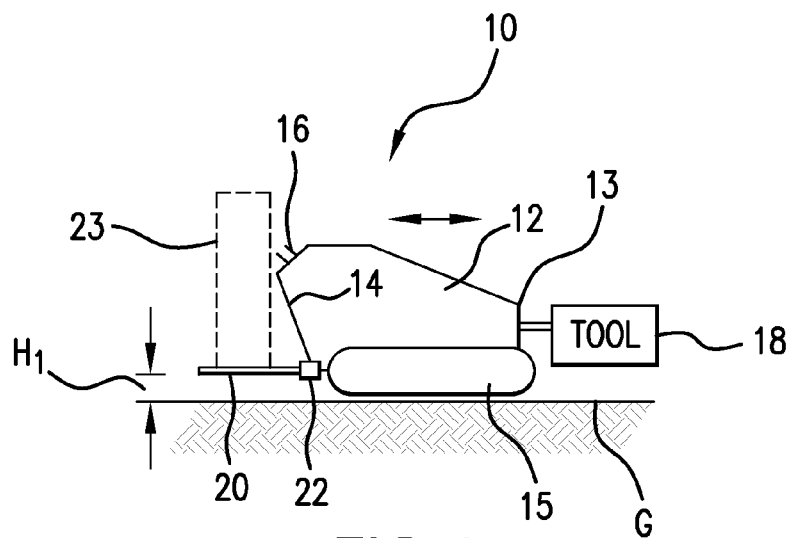
FIG. 1 is a side view schematically illustrating a self-propelled vehicle with a rider platform in an in-use position, according to an embodiment of the present invention.

FIG. 1 is a side view schematically illustrating a self-propelled vehicle 10, according to an embodiment of the present invention. As shown in FIG. 1, self-propelled vehicle 10 comprises vehicle frame 12 including front portion 13, rear portion 14, mover 15, and controls 16. In one embodiment, a tool 18 is removably attached to front portion 13 of vehicle frame 12. Mover 15 comprises powered wheels or tracks for moving vehicle 10 across ground G.

A platform 20 is mounted to rear portion 14 of vehicle frame 14 via pivot mechanism 22. Platform 20 defines an elevated operator zone 23 at rear portion 14 of vehicle 10 for operating controls 16. In the in-use position shown in FIG. 1, the operator can ride on the platform 20 above the ground (shown by distance H1) while operating the controls 16 of vehicle 10.

Figure 2:
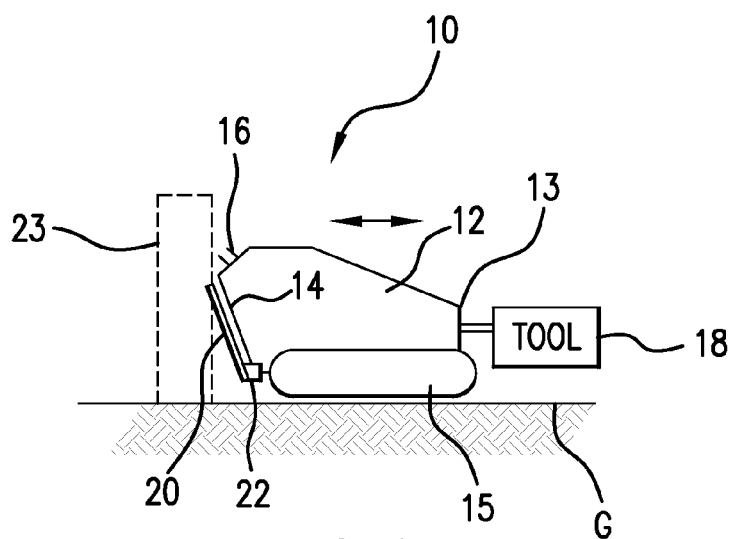
FIG. 2 is a side view schematically illustrating a self-propelled vehicle with a rider platform in a storage position, according to an embodiment of the present invention.

FIG. 2 is a side view of the embodiment of FIG. 1, except showing platform 20 in a storage position. In the storage position, platform 20 is pivoted via pivot mechanism 22 into a generally upright position and secured into close proximity to the rear portion 14 of the vehicle 10 to enable walk-behind use of vehicle 10. In the storage position, platform 20 enables unobstructed pedestrian operation of the self-propelled vehicle 10 in the walk-behind mode.

This pivotally mounted platform 20 can be constructed as a permanent feature of the self-propelled vehicle 10 or as retro-fit feature that is attached to a self-propelled vehicle not having a rider platform.

Riding on the platform 20 introduces greater feedback between movement of the vehicle/loader relative to the operator, since the platform 20 enables an operator to sense vehicle movement through their legs and feet, as well as through their hands at the controls 16. In addition, platform 20 places the operator at a greater height relative to the vehicle 10, enabling better line-of-sight to tool 18 (e.g., a loader bucket, auger, pallet fork, etc) at front portion 13 to enhance operator control of tool 18 and/or vehicle 10. Providing a ride-on platform 20 also enables the operator greater vision of the terrain to spot obstacles, people, and any objects to be manipulated by the vehicle 10. The operator also experiences less fatigue when riding on platform 20 than in a walk-behind mode since they are carried by the vehicle 10. Accordingly, many aspects of operating a self-propelled vehicle 10 are enhanced via the elevated operator zone 23 created by the rider platform 20.

Providing a ride-on platform 20 also enables the weight of the operator standing on the platform 20 to act as an additional counterweight on a self-propelled vehicle 10, thereby increasing the effective weight-bearing capacity of the vehicle at the front portion 13 of the vehicle frame 12. The weight of the operator also contributes to the function of the platform 20 as an anti-tipping measure, thereby limiting the extent of rearward rotation of vehicle 10. In particular, the additional effect of the long moment arm relative to a gravitational center of the vehicle (i.e., a fulcrum about which the front and rear of the vehicle tip relative to one another) that is provided by the operator standing on platform 20 multiplies the effect of the operator-provided counter-weight. Moreover, since the operator is not harnessed to a seat, the operator can quickly hop-on or hop-off the platform 20 to quickly add or subtract the counter weight. For example, the lifting capacity at the front portion 13 of the vehicle 10 can be increased when the self-propelled vehicle 10 is on a level surface (or a declining surface) by the operator hopping on the platform 20 at the rear portion 14 of the vehicle 10 to add a counter weight. In another example, when the vehicle 10 is on an inclining surface, and the front portion 13 of the vehicle is not carrying a load, then the operator can hop off the platform 20 to limit the extent of backward tipping of the vehicle.

Providing a ride-on platform 20 also enhances tipping control of the vehicle by providing a structure capable of striking the ground, thereby limiting backward rotation of the vehicle 10 when the vehicle experiences loads or terrain that would otherwise cause the front portion 13 of the vehicle to rise in elevation significantly relative to the rear portion 14 of the vehicle. In one embodiment, rollers are attached to the vehicle frame (via a mounting frame of the platform) adjacent the rear portion 14 of the vehicle 10 to act an additional anti-tipping measure.

In one embodiment, pivot mechanism 22 also comprises a latch mechanism. The pivot mechanism 22 supports pivotal movement of the platform 20 relative to the rear portion 14 of the vehicle frame 12 between a generally horizontal in-use position (FIG. 1) and a generally upright storage position (FIG. 2). In one aspect, in the storage position of the platform, the latch mechanism is engaged to releasably secure platform 20 relative to rear portion 14 of the frame 12 to maintain platform 20 in a generally upright position, thereby enabling walk-behind use. In the in-use position, the latch mechanism is disengaged to release platform 20 relative to rear portion 14 of the frame 12, thereby allowing platform 20 to pivot downward to rest in a generally horizontal in-use position to receive a rider. To return the platform 20 to the storage position (FIG. 2), the platform 20 is pivotally rotated upward via pivot mechanism 22 toward the frame 12 until the latching mechanism is engaged to releasably secure the platform 20 relative to rear portion 14 of the frame 12.

Additional components and/or alternative components also comprise other embodiments of the invention. In one embodiment, the platform 20 is height-adjustable in the in-use position enabling the rider to be positioned at different heights relative to the controls 16 mounted at the rear portion 14 of the self-propelled vehicle 10. In another embodiment, a shock-absorbing connecting link is interposed between the platform 20 and the vehicle frame 12 to absorb the machine vibration to the operator when the platform 20 is in the riding in-use position, thereby minimizing operator fatigue. In another embodiment, the platform 20 includes a padded portion at its rear end and/or its sides to protect an operator or to protect nearby equipment and surroundings from contact with edges or corners of the platform. The padded portion comprises one or more layers or coatings of plastic, rubber, foam, or other cushioning materials. The padded portion also can comprise a non-slip surface.

Embodiments of the present invention also comprise variations on mechanisms for pivotally attaching a rider platform to a self-propelled vehicle. In one embodiment, platform 20 is mounted with two pivot mechanisms, with the pivot mechanisms located on opposite sides of the platform 20. In another embodiment, the pivot mechanism is located adjacent a central region of the platform between two opposite sides of the platform. In this embodiment, a single link pivotally connects the platform 20 to a rear portion 14 of the frame of the self-propelled vehicle 10 and includes a locking mechanism to enable securing the platform in either a generally horizontal in-use position or a generally upright storage position and to enable pivotal movement of the platform between the in-use and the storage position.

In one embodiment, the pivot mechanism and its associated latch mechanism are located adjacent each other at a side portion of the platform. In other embodiments, the pivot mechanism and its associated latch mechanism are located in separate positions from each other. In one aspect, one or more pivot mechanisms are located adjacent a side portion of the platform while one or more latch mechanisms are located adjacent a center portion of the platform. In another aspect, one or more pivot mechanisms are located adjacent a central portion of the platform while one or more latch mechanisms are located adjacent a side portion of the platform.

Embodiments of the invention enable a walk-behind use of the vehicle 10 without complete removal of platform 20 from vehicle 10 because of the low-profile of platform 20 in its storage position. Accordingly, in one embodiment, platform 20 supports an operator without any additional wheels or rollers mounted at an outer end of platform or underneath platform 20. However, in other embodiments, wheels, rollers, or skids are mountable at an outer end or bottom surface of platform 20 while still maintaining a low-profile of platform 20 in its storage position.

Figure 3:
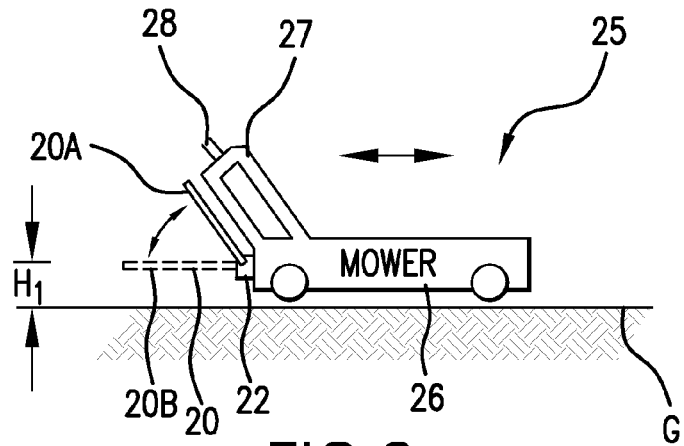
FIG. 3 is a side view schematically illustrating a self-propelled mower with a pivoting rider platform, according to an embodiment of the present invention.

FIG. 3 is a side view illustrating a self-propelled landscaping vehicle 25, such as a mower. As shown in FIG. 3, vehicle 25 comprises frame 26, handle 27, and controls 28. Vehicle 25 also comprises platform 20 which is movable via pivot mechanism 22 between an in-use position 20B and a storage position 20A. Platform 20 and pivot mechanism 22 of FIG. 3 comprise substantially the same features and attributes as platform 20 and pivot mechanism 22 of FIGS. 1-2, except for the replacement of vehicle 10 with vehicle 25.

These embodiments of the invention, and additional embodiments of the invention, are described in greater detail in association with FIGS. 4-17.

Figure 4:
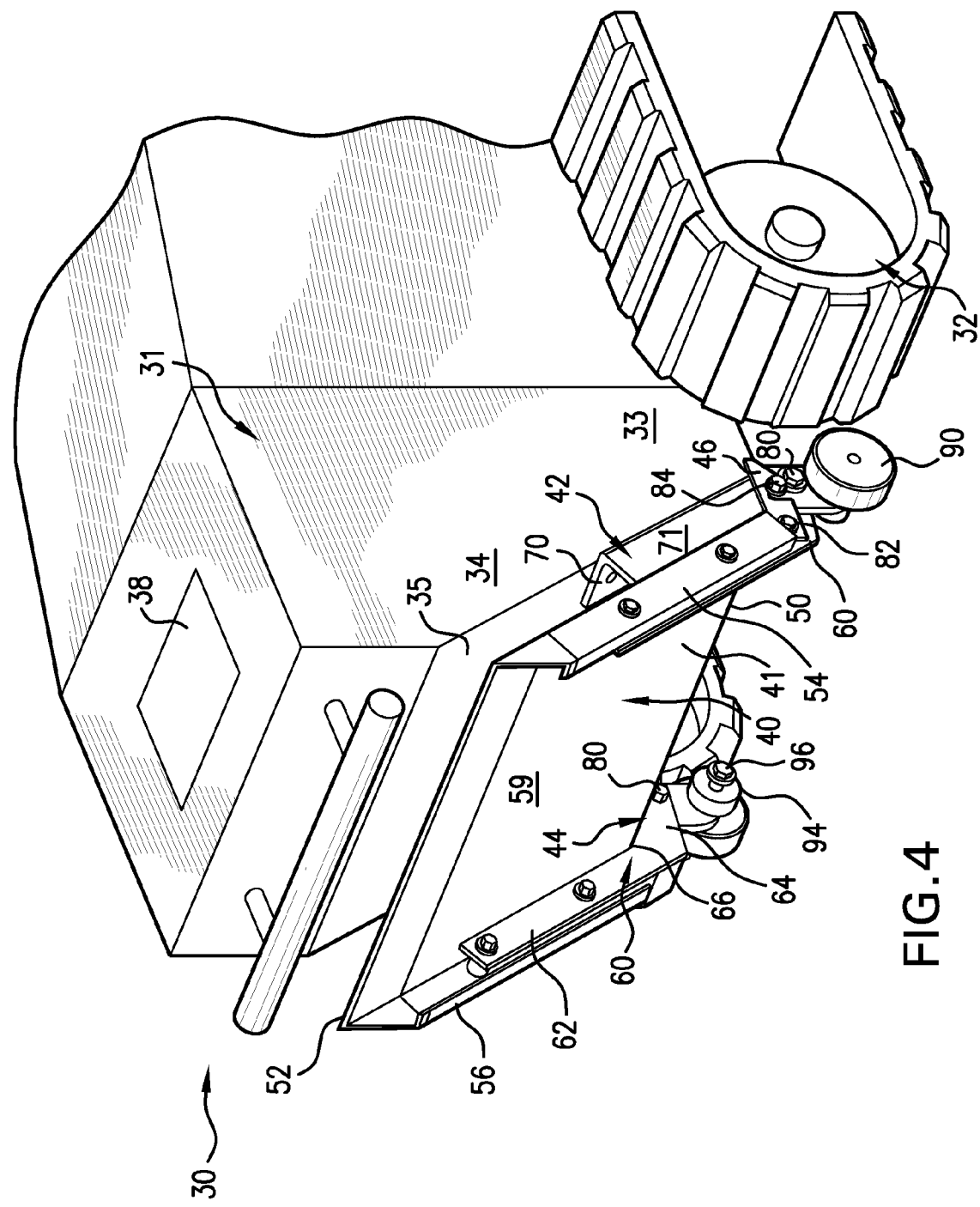
FIG. 4 is a perspective view of a self-propelled vehicle with a rider platform in a storage position, according to an embodiment of the present invention.
Figure 5:
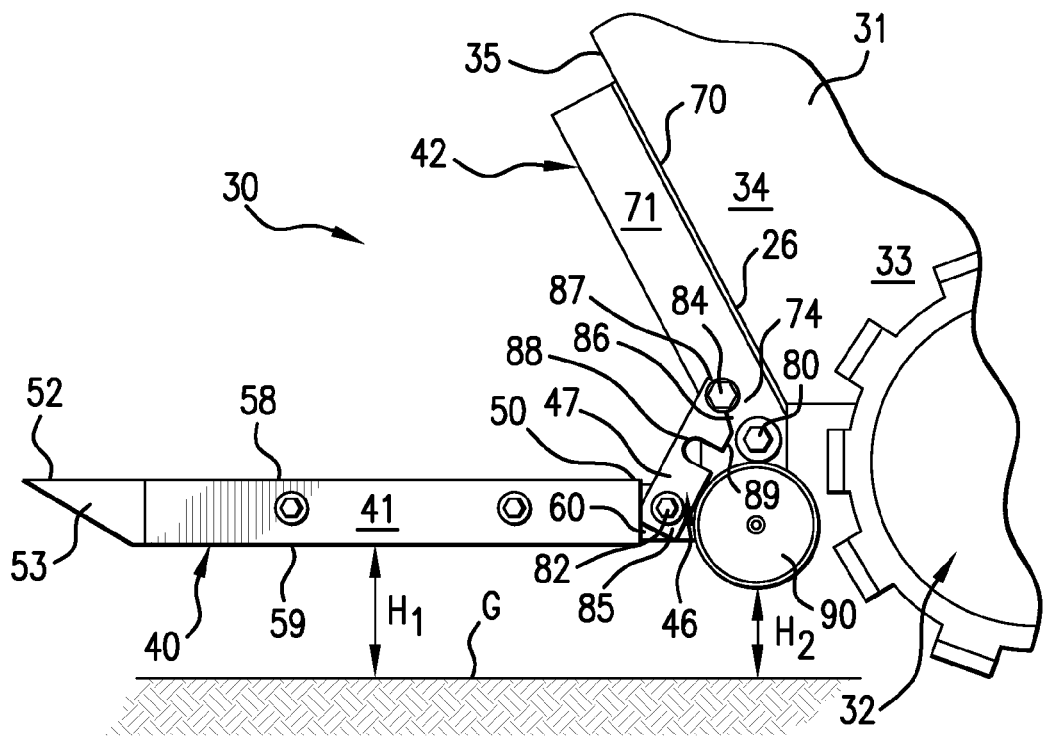
FIG. 5 is partial side view of a self-propelled vehicle with the rider platform in an in-use position, according to an embodiment of the present invention.
Figure 6:
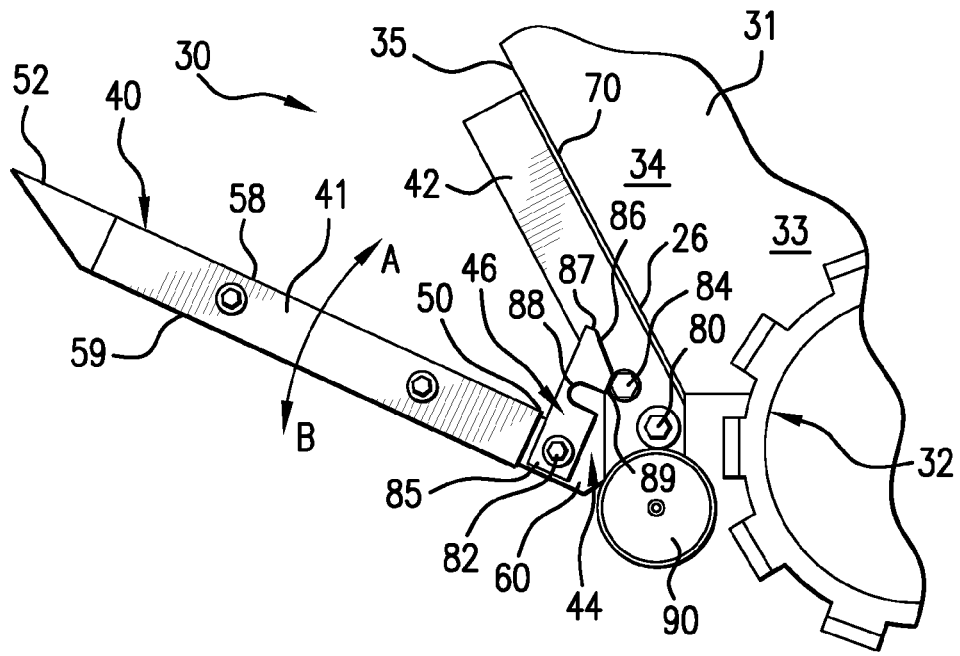
FIG. 6 is partial side view of the embodiment of FIG. 5 with the rider platform in an intermediate position, according to an embodiment of the present invention.
Figure 7:
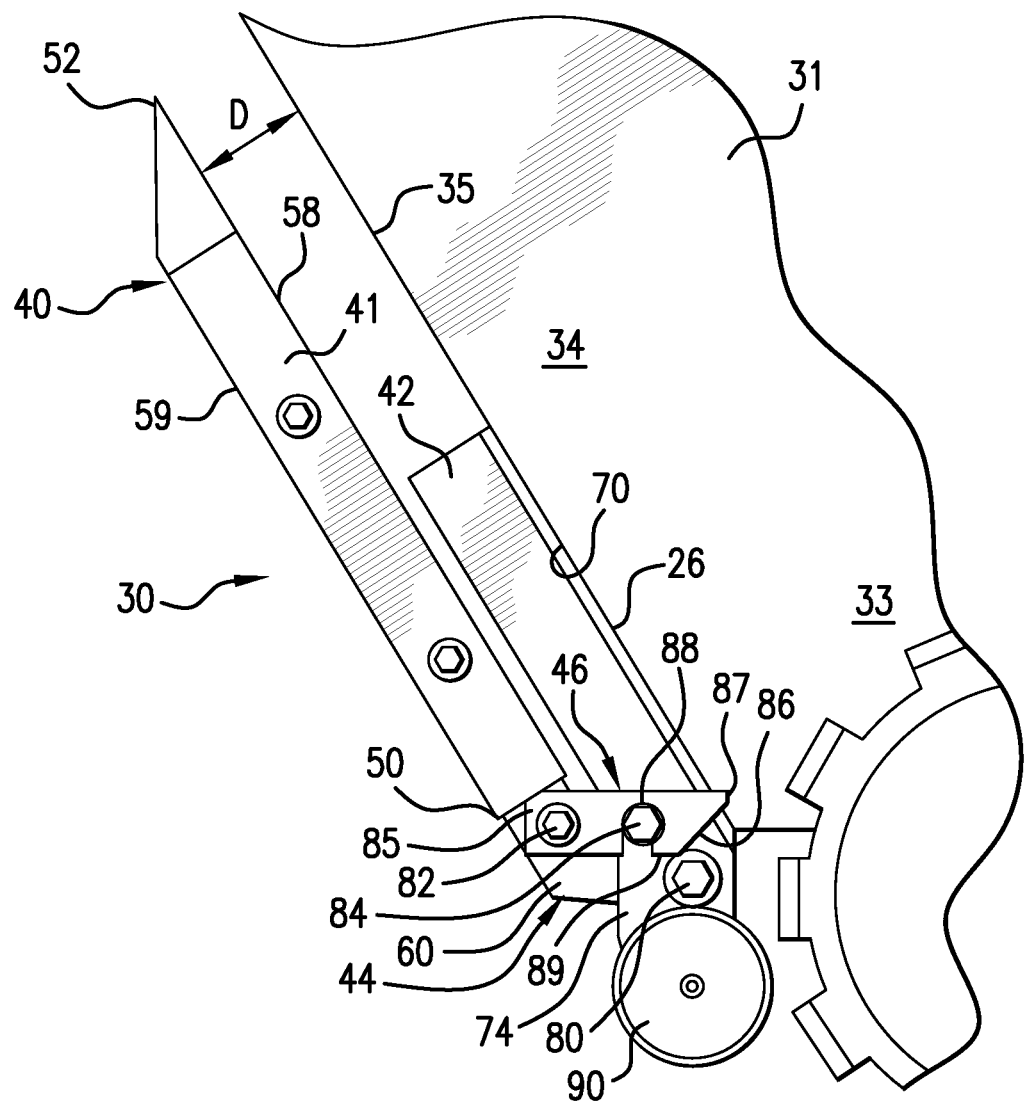
FIG. 7 is partial side view of the embodiment of FIG. 5 with the rider platform in a storage position, according to an embodiment of the present invention.

FIG. 4 is a perspective view of a platform system 40 of a self-propelled vehicle 30, according to an embodiment of the invention, including a rider platform 41 in a storage position. FIGS. 5-7 are side views of the platform system 40 of FIG. 4 showing the rider platform in an in-use position, an intermediate position, and a storage position, respectively, according to one embodiment of the invention. Various aspects and functions of platform system 40 are described together in association with FIGS. 4-7, which illustrate the same components in different views.

As shown in FIG. 4, vehicle 30 includes vehicle frame 31, mover 32, lower portion 33, rear portion 34 having rear surface 35 and a front portion substantially similar to front portion 13 in FIG. 1. The front portion enables removably securing various attachments such as loader buckets, pallet forks, augers, mowers, etc. Mover 32 comprises a drive mechanism such as power-driven wheels, tracks, etc. Vehicle 30 also includes control module 38 positioned at rear portion 34. Platform system 40 is removably attachable to vehicle frame 31, and once attached, enables pivotal movement of platform 41 between an in-use position (shown in FIG. 5) and a storage position (shown later in FIG. 7). In the in-use position, platform system 40 enables ride-on operation of vehicle 30. In the storage position, platform system 40 enables walk-behind operation of vehicle 30.

Platform system 40 defines platform 41 and is mounted to vehicle frame 31 via mounting bracket 42. Platform 41 is sized and shaped to support an operator standing upright, with some ability to maneuver their feet on the platform. As shown in FIG. 4, platform 41 is a generally rectangular shaped member. Platform 41 comprises inner end 50, outer end 52, first side 54, second side 56, upper support surface 58 (FIG. 5), and lower surface 59. Platform system 40 includes, for mounting on each of the opposite sides 54,56 of platform 41, a pivot mechanism 44 and latch mechanism 46, as well as a mounting frame 42 to connect platform 41 to vehicle frame 31. The respective pairs of pivot mechanisms 44, latch mechanisms 46, and mounting frames 42 are laterally spaced apart at the rear portion 34 of vehicle by a distance generally corresponding to a width of rear portion 34. In another embodiment, the structure and function of mounting frame 42 is provided by vehicle frame 31 so that pivot mechanism 44 and latching mechanism 46 are directly coupled from platform 41 to vehicle frame 31 without a mounting frame 42.

Self-propelled vehicle 30 including platform system 40 is described and illustrated in greater detail in association with FIGS. 4-17.

As shown in FIGS. 4-7, mounting frame 42 is sized and shaped to enable pivot point 80 of pivot mechanism 44 to be located as close as possible to vehicle frame 31 with enough clearance for inner end 50 of platform 41 to rotate relative to rear surface 35 of vehicle frame 31 and for support surface 58 of platform 41 to be closely adjacent rear surface 35 of vehicle frame 31, when platform 41 is in its storage position. In one aspect, as shown in FIGS. 4-5, mounting frame 42 includes first portion 70 and second portion 71. First portion 70 of mounting frame 42 is fastened to rear surface 35 of vehicle frame 31 and second portion 71 extends outwardly from first portion 70 at an angle (e.g., 90 degrees) to enable mounting of pivot mechanism 44, latch mechanism 46, roller 90 and any other associated components of attachable platform 40 relative to mounting frame 42.

FIG. 4 also reveals aspects of pivot mechanism 44, including but not limited to, pivot arm 60, pivot point 80, and stop mechanism 94. As shown in FIG. 4, pivot arm 60 includes first portion 62 and second portion 64 forming a generally obtuse angle relative to each other at junction 66. First portion 62 of each pivot arm 60 is mounted to a respective first and second side (54, 56) of platform 41. Second portion 64 of each pivot arm 60 is pivotally mounted (at pivot point 80) to a respective mounting frame 42 on opposite sides of rear surface 26. Pivot point 80 is a point on mounting frame 42 about which pivot arm 60 of platform 41 pivots to move platform 41 between the in-use position (FIG. 5) and the storage position (FIG. 4,7). Pivot point 80 comprises a combination of pin(s), hole(s), and fastener(s) adapted to enable second portion 64 of arm 60 to pivot relative to second portion 71 of mounting frame 42.

In one aspect, the length of first portion 62 and second portion 64 of pivot arm 60, relative to each other, and the angle formed between first portion 62 and second portion 64 are selected so that when platform 41 is pivotally mounted to vehicle frame 31 via pivot arm 60, pivot arm 60 enables extension of platform 41 in a generally horizontal resting position relative to the vehicle frame 31, and also permit adequate clearance for pivoting of inner end 50 of platform 41 relative to vehicle frame 31 to move platform 41 to its storage position (FIGS. 4 and 7). A variety of lengths of first portion 62 and second portion 64 and a variety of angles at junction 66 of pivot arm 60 can be used to achieve pivoting function depending upon the size and the geometry of vehicle frame 31. Accordingly, pivot arm 60 is not strictly limited to the shape and geometry shown in FIGS. 4-17.

As shown in FIGS. 4-5, stop mechanism 94 is secured to mounting frame 42, via spring-loaded fastener 96, generally below pivot point 80 to limit pivoting movement of arm 60. Stop mechanism 94 is further described in association with FIGS. 5-17.

FIGS. 4-7 also illustrate latch mechanism 46. Latch mechanism 46 selectively maintains platform 41 in the either storage position or the in-use position. As shown in FIG. 5, latch mechanism 46 comprises body 47, pivot point 82, first end 85, beveled surface 86, second end 87, recess 88, and flat surface 89. Pivot point 82 comprises a point of latch body 47 that is pivotally mounted relative to a portion of platform 41, or a pivot arm 60 of platform 41 (best seen in FIG. 4). Pivot point 82 comprises a combination of pin(s) and hole(s) enabling pivotal movement of latch body 47 adjacent first end 85 so that second end 87 swings in and out of releasable engagement with pin 84 of mounting frame 42. As shown in FIG. 5, in the in-use position in which platform 41 rests in a generally horizontal position, gravitational forces cause beveled surface 86 of latch body 47 to rest against pin 84 of mounting frame 42.

FIGS. 4-7 also illustrate roller 90, which is mounted to a lower portion of mounting frame 42 in one embodiment of the invention. In one aspect, roller 90 is positioned to make first contact with the ground in the event that vehicle 30 tips backward during ordinary use, thereby relieving pivot mechanism 44 and platform 41 from wear and tear due to ground contact, and helping to stabilize the rider on platform 41. Accordingly, roller 90 acts as a balancing mechanism for both the rider (standing in operator zone 23 of FIG. 1) and the vehicle 30 when maneuvering the vehicle 30 over an obstacle, uneven terrain, or steep terrain. As shown in FIG. 5, the bottom of roller 90 is positioned at a height H2 above the ground G at a height lower than the general operating height H1, at which a lower surface 59 of platform 41 generally extends above ground G. Accordingly, roller 90 is in position to generally strike the ground before platform 41 during a rearward tipping of vehicle frame 12.

In another embodiment, roller 90 is omitted from platform system 40.

While not shown in each Figure of FIGS. 4-17, it is understood that platform 40 of vehicle 30 comprises roller 90 in each embodiment, except where roller 90 is omitted selectively as desired by an operator, retailer, manufacturer, etc. In addition, a roller 90 is generally mounted on both sides of the platform (e.g. opposite sides of platform 41 at a respective mounting frame 42 as shown in FIGS. 4-5).

FIG. 6 is a side view of platform 40 in an intermediate position, during pivoting movement (represented by directional arrow A) between the generally horizontal in-use position (FIG. 5) and the generally upright storage position (FIG. 7), according to one embodiment of the invention. For discussion purposes, platform 41 is assumed to be moved upward from the in-use position toward the storage position. As shown in FIG. 6, outer end 52 of platform 41 is lifted upward with inner end 50 of platform 41 pivoting relative to pivot point 80, thereby causing beveled surface 86 of latch body 47 to slide upward against fixed pin 84 on mounting frame 42. This sliding motion continues as outer end 82 of platform 41 is pivotally raised upward so that flat surface 89 of latch body 47 begins to slide against pin 84. As shown in FIG. 6, when platform 41 becomes generally upright and generally parallel to rear surface 26 of vehicle frame 12, recess 88 of latch body 47 drops (by force of gravity) onto pin 84. In this position, the operator releases outer end 52 of platform 41 allowing gravity to exert downward forces against second end 52 of platform 41, with recess 88 of latch body 47 maintaining pressing engagement with pin 84 of mounting frame to prevent downward pivotal movement of platform 41.

FIG. 7 is a side view illustrating platform 41 in a generally upright storage position, according to one embodiment of the invention. As shown in FIG. 7, with recess 88 of latch body 47 resting securely on pin 84 of mounting frame 42, platform 41 is securely positioned close to rear surface 35 of vehicle frame 31 with support surface 58 spaced a short distance D from rear surface 35. The distance D can be selected to either larger or smaller than shown, and support surface 58 optionally need not be generally parallel to rear surface 35 of vehicle frame 31.

To restore platform 41 to its in-use position, the operator simply supports outer end 52 of platform 41 while lifting second end 87 of latch body 47 upward to withdraw recess 88 from its locked position on pin 84. As platform 41 is rotated downward to the in-use position, flat surface 89 and beveled surface 86 of latch body 47 slide against pin 84 (shown in FIG. 6) until platform 41, including latch mechanism 46, are returned to their in-use position (FIG. 5).

In one embodiment, pivot mechanism 44 and latch mechanism 46 are secured relative to platform 41 independent of each other. In another embodiment, pivot mechanism 44 and latch mechanism 46 can take several forms, in addition to those shown, including components such as fasteners, hooks, pivot members, pins, or holes, that reciprocally engage each other and that can be mounted on either the frame of the vehicle and/or the platform in various combinations to achieve the pivoting and latching functions described in association with FIGS. 1-17.

FIG. 8 is enlarged perspective view of platform 41 in its in-use position, further illustrating interaction between pivot mechanism 44 and stop mechanism 94. As shown in FIG. 8, second portion 64 of pivot arm 60 extends outwardly from underneath inner end 50 of platform 41 and up to pivot point 80. Contact surface 65 of second portion 64 rests against contact surface 95 of stop mechanism 94. Stop mechanism 94 prevents further pivotal movement of arm 60 relative to pivot point 80, thereby maintaining the position of platform 41 in a generally horizontal in-use position because of the relative angle of second portion 64 and first portion 62 of arm 60. Fastener 96 includes spring 97 and maintains stop mechanism 94 in position relative to mounting frame 42. As shown in FIG. 8, stop mechanism 94 is a generally disc shaped member.

In one embodiment, stop mechanism 94 is made from a hard material, such as a metal. In another embodiment, stop mechanism 94 is made from a generally elastic polymer material to thereby act as a shock-absorbing link between platform 41 and vehicle frame 31. This shock-absorbing link introduces a dampening effect between platform 41 and vehicle frame 31, thereby diminishing the amount of shock, dramatic forces, and/or vibrations transmitted from vehicle frame 31 to an operator on platform 41.

Moreover, this shock-absorbing link is not strictly limited to providing stop mechanism 94 as an elastomeric material, but can extend to other types of dampening materials, as well as other dampening and/or spring mechanisms and/or other suspension mechanisms, that are interposed between platform 41 and vehicle frame 31. The shock-absorbing parameters of this link, including a dampening parameter and spring rate, can be selected to vary the quantity and quality of the shock-absorbing link, including making a spring-based shock-absorbing link, either damped or undamped.

This shock-absorbing link can be independent of pivot mechanism 44 and stop mechanism 94, or can be a component of pivot mechanism 44 and/or stop mechanism 94.

A shock-absorbing link, according to one embodiment of the invention, is later described in association with FIG. 17.

Figure 10:
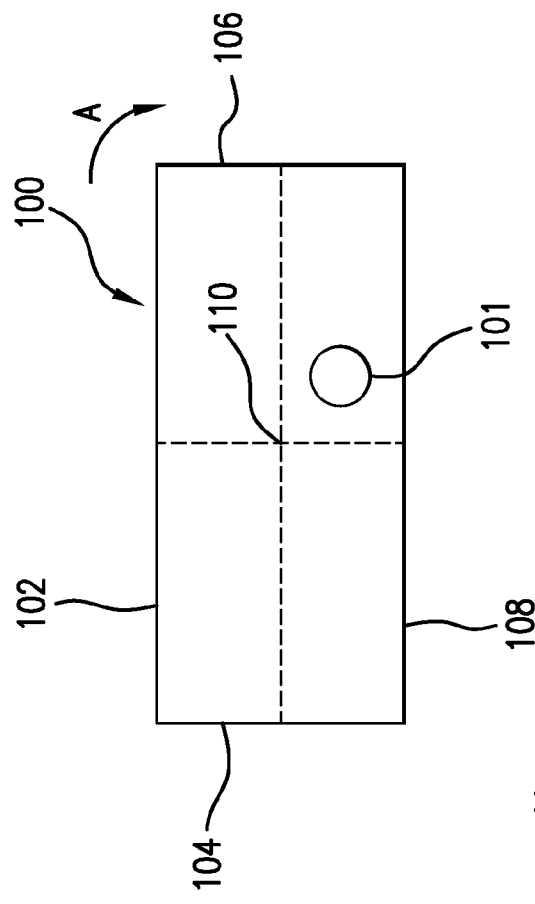
FIG. 10 is schematic illustration of the variably positionable stop mechanism of the embodiment of FIG. 9, according to an embodiment of the present invention.
Figure 9:
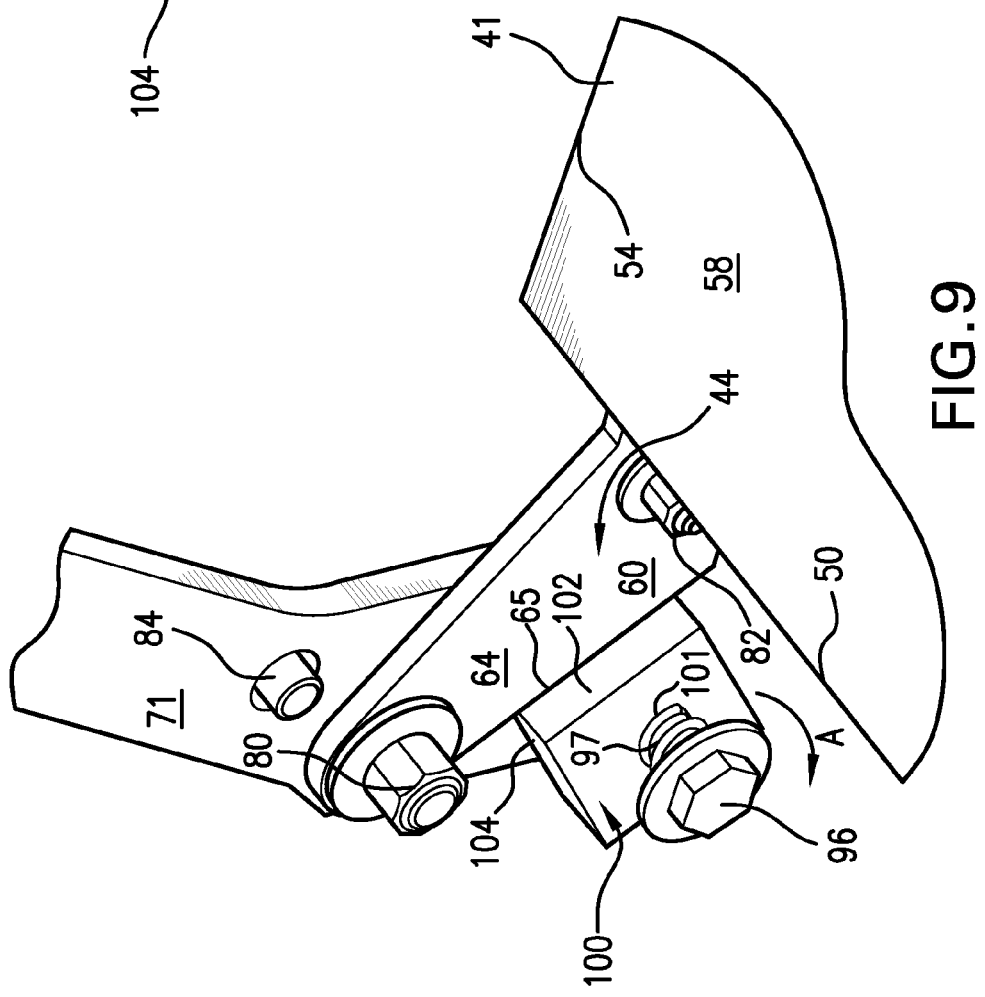
FIG. 9 is an enlarged perspective view of a pivot mechanism and variably positionable stop mechanism of a platform system, according to another embodiment of the present invention.

FIG. 9 is an enlarged perspective view of platform 40 in its in-use position, illustrating another embodiment including a stop mechanism 100 (in place of stop mechanism 94) which enable platform 41 to be adjusted to different heights relative to vehicle frame 31 in the in-use position of platform 41. As shown in FIGS. 9-10, stop mechanism 100 includes a generally rectangular-shaped block having mounting hole 101, and four contact surfaces 102, 104, 106, and 108. As shown in FIG. 9, contact surface 102 of block 100 is positioned to receive pressing engagement from contact surface 65 of arm 60. However, fastener 96 enables selective rotation of block 100 into four different positions so that each of the other contact surfaces 104, 106 and 108 of block 100 can be pressingly engage contact surface 65 of pivot arm 60.

FIG. 10 is a schematic drawing, illustrating block 100 with its contact surfaces 102-108 and mounting hole 101. As shown in FIG. 10, mounting hole 101 is positioned off-center relative to both a major axis and a minor axis of block 100. This off-center positioning, in combination with the rectangular shape of block 100, results in each contact surface 102-108 causing contact surface 65 of pivot arm 60 to be supported at a different distance relative to fastener 96 on mounting frame 42, thereby causing platform 41 to be fixed at a different height relative to the ground for each of the different contact surfaces 102-108. While FIGS. 9-10 illustrate a generally rectangular-shaped block as stop mechanism 100, other shaped stop mechanisms (e.g., n-gon, triangular, etc) can be used to achieve desired variable height positioning of platform 41.

Figure 11:
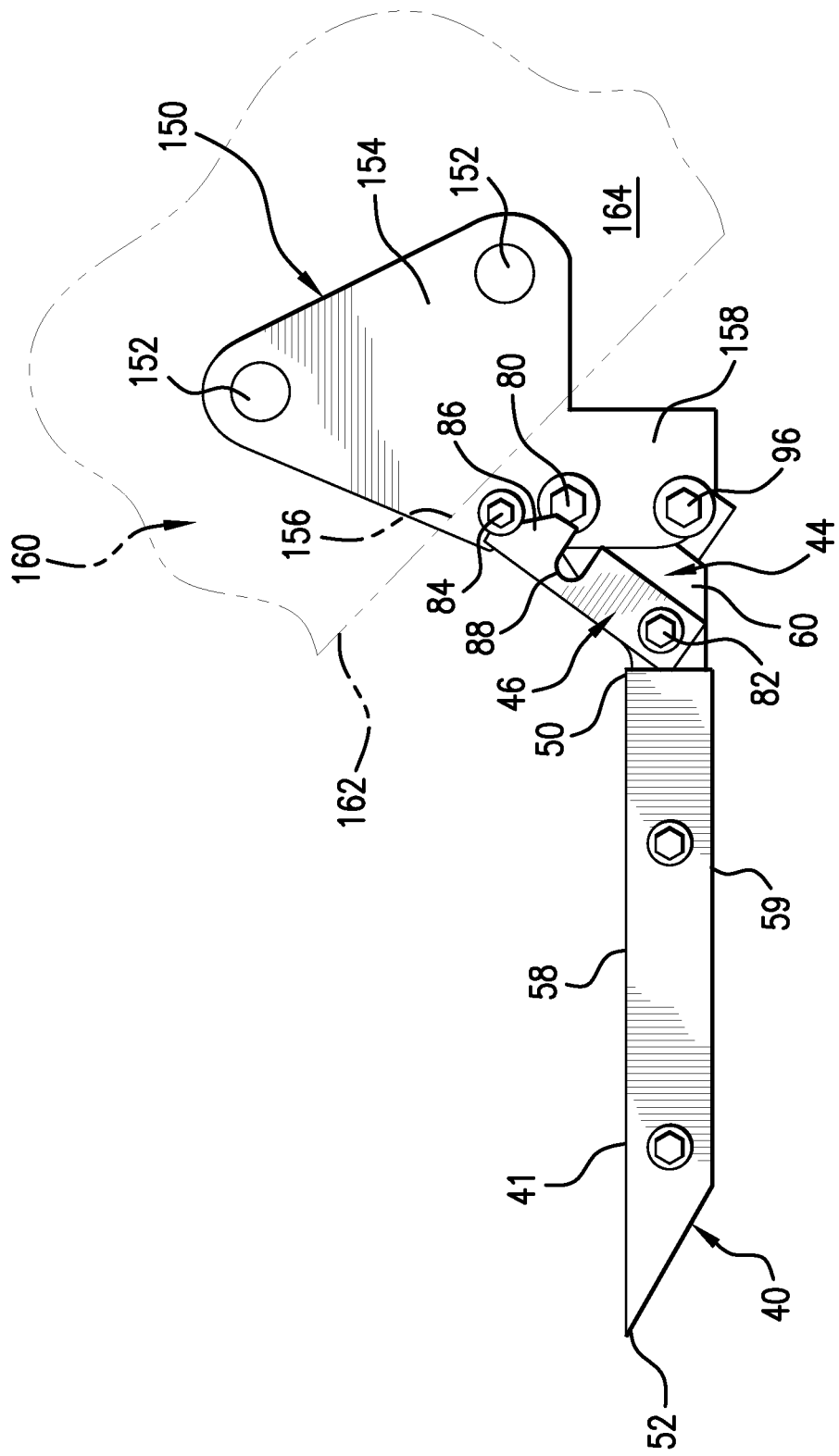
FIG. 11 is a side view of a platform system with an alternative mounting frame, according to an embodiment of the present invention.

FIG. 11 is a side view illustrating a self-propelled vehicle having a platform 41 (including pivot mechanism 44 and latch mechanism 46) having substantially the same features and attributes as vehicle 30, except replacing mounting frame 42 with mounting frame 150 to accommodate a different shape of vehicle frame 160 (similar to vehicle frame 31). As shown in FIG. 11, pivot mechanism 44 and latch mechanism 46 are mounted to mounting frame 150. Mounting frame 150 is fixed to a side surface 164 of vehicle frame 160 in contrast to mounting frame 42 which is fixed to rear surface 35 of vehicle frame 31 via portion 70 (FIGS. 4-7).

As shown in FIG. 11, mounting frame 150 comprises first body portion 154, holes 152 for mounting to vehicle frame 160, and second body portion 158. An imaginary line 156 generally denotes a boundary between first and second body portions 154, 158. First body portion 154 of mounting frame 150 is sized and shaped so that when fixed to a side surface 164 at the rear portion of vehicle frame 160, boundary 215 generally corresponds to a location of rear surface 162 of vehicle frame 160 (similar to rear surface 35 of vehicle frame 31) from which second body portion 158 extends. This arrangement enables mounting and functioning of pivot mechanism 44 and latch mechanism 46 at a pivot point 80 and fasteners 84, 96 in a position close to, but spaced from, rear surface 35 of vehicle frame 160 to achieve the functions and features previously described for platform 40 in association with mounting frame 42 (FIGS. 1-10).

Except for the different position of side-mounting frame 150 relative to vehicle frame 160 in FIG. 11 (as compared to the position of mounting frame 42 relative to vehicle frame 31 in FIGS. 4-7), all other features and attributes of platform system 40, including platform 41, pivot mechanism 44, and latch mechanism 46 of platform system 200 as illustrated in FIG. 11 are substantially the same as previously described in association with FIGS. 1-10.

Figure 12:
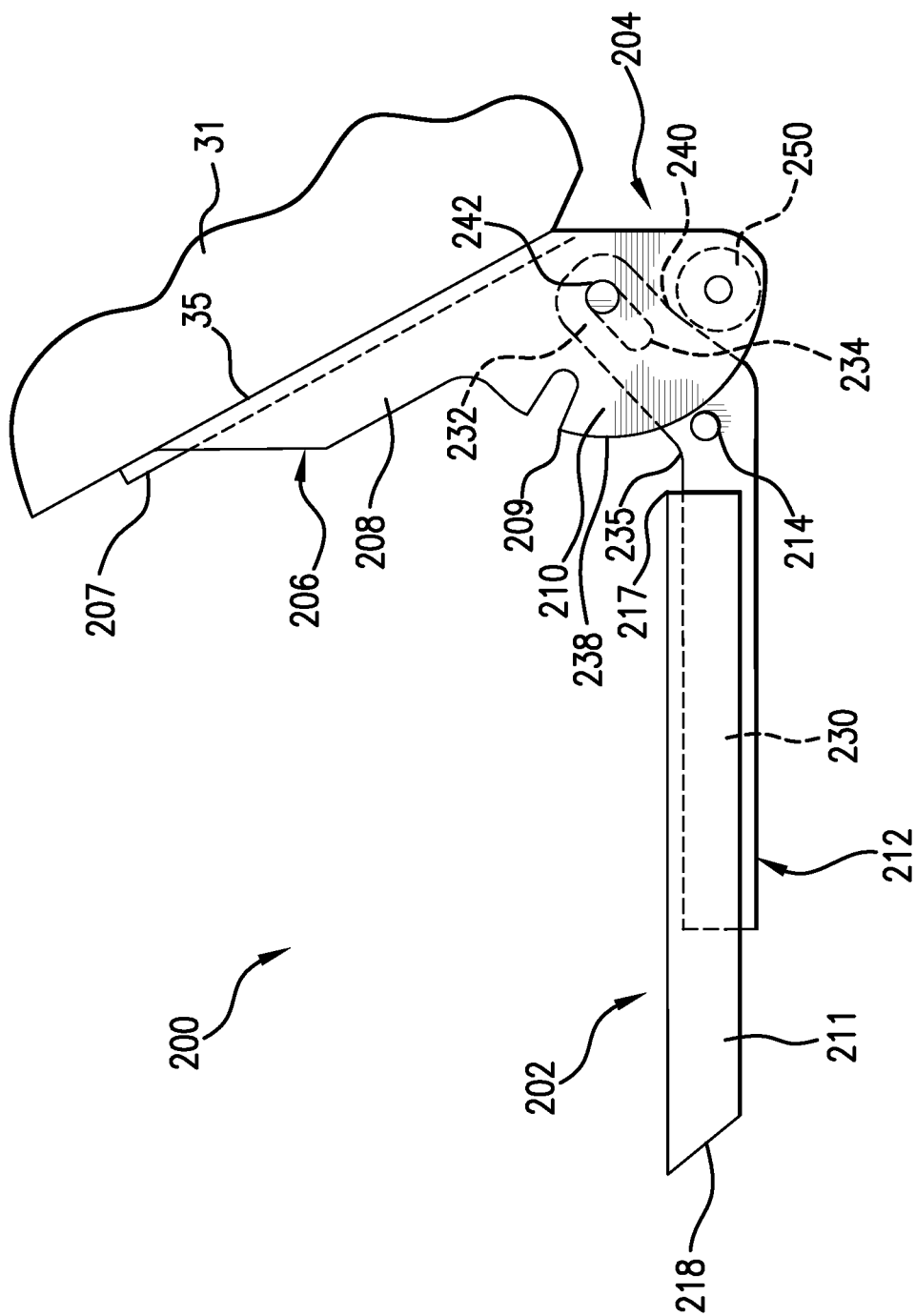
FIG. 12 is a side view of a rider platform in an in-use position, according to another embodiment of the present invention.

FIG. 12 is a side view illustrating a platform system 200, according to another embodiment of the invention. As shown in FIG. 12, platform system 200 comprises platform 202, pivot mechanism 204, and mounting frame 206. Platform 202 includes support plate 211 and comprises inner end 217 and outer end 218. Support arm 212 comprises outer end 230, secured to and supporting support plate 211, and inner end portion 232 which are joined together at junction 235 defining an generally obtuse angle between outer portion 230 and inner end portion 232. Mounting frame 206 comprises first portion 207, second portion 208, and lower portion 210 defining slot 209. Pivot mechanism 204 comprises components mounted on, or interacting with either platform 202 or mounting frame 206 to enable pivotal movement of platform 202 between in in-use position shown in FIG. 12 and a storage position shown later in FIG. 15.

As shown in FIG. 12, pivot mechanism 204 comprises pin 242 mounted on lower portion 210 of mounting frame 206 and slot 234 of inner end portion 232 of support arm 212. In one aspect, pivot mechanism 204 also comprises a securing mechanism comprising pin 214 mounted on support arm 212 and a slot 209 of lower portion 210 of mounting frame 206. Slot 234 of support arm 212 is generally elongate slot with closed ends, enabling sliding movement of inner end portion 232 of support arm 212 relative to pin 242. However, pin 214 which protrudes from support arm 212 is adjacent an outer edge 238 of lower portion 210 of mounting frame 206. In one aspect, pin 214 acts to prevent sliding movement of support arm 212 (and platform plate 211) inward toward rear surface 35 of the vehicle frame. Further interaction of the components of pivot mechanism 204 is described in association with FIGS. 13-16.

As shown in FIG. 12, stop mechanism 250 (shown in phantom) is secured to lower portion 210 of mounting frame 206 and limits movement of inner end portion 232 of support arm 212 via contact at surface 240 of support arm 212. Stop mechanism 250 comprises substantially the same features and attributes as stop mechanism 94, as previously described in association with FIGS. 1-11, and as further illustrated in FIG. 13.

FIG. 13 is a perspective view of the embodiment of FIG. 12, which further illustrates the components of platform system 200 as described and illustrated in FIG. 12. As shown in FIG. 13, pin 242 protrudes through slot 234 of inner end portion 232 of arm 230 while pin 214 protrudes outwardly in a generally opposite direction to enable engagement with slot 209.

Figure 15:
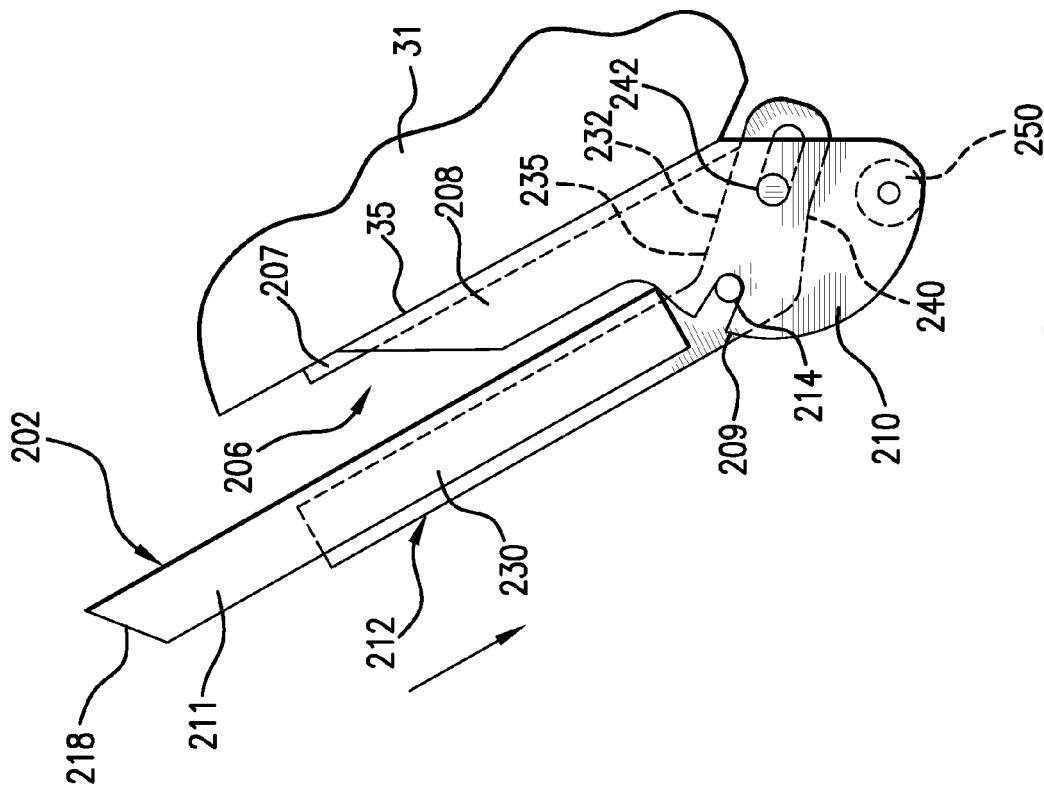
FIG. 15 is a side view of the rider platform of the embodiment of FIG. 12 in a storage position, according to an embodiment of the present invention.
Figure 14:
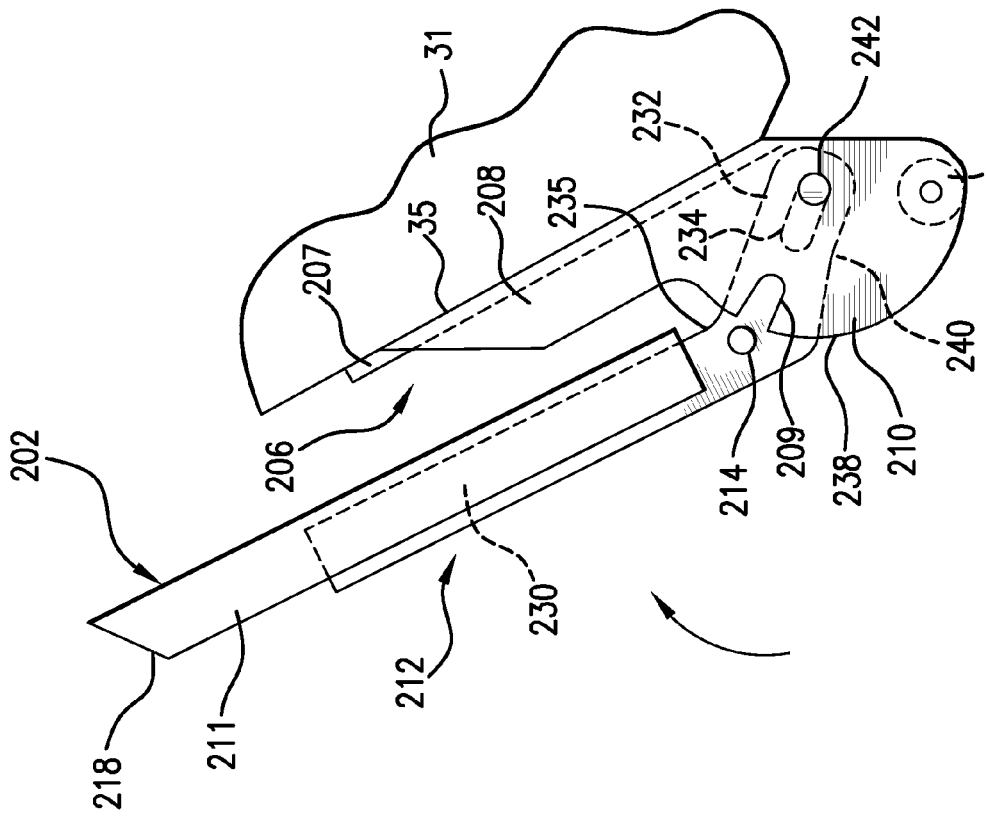
FIG. 14 is a side view of the embodiment of FIG. 12 with the rider platform in an intermediate position, according to an embodiment of the present invention.

FIG. 14 is a side view of the embodiment of FIGS. 12 and 13, according to one embodiment of the invention, illustrating the platform 202 in an intermediate position between an in-use position (FIG. 12) and a storage position (FIG. 15). As shown in FIG. 14, platform 202 is rotated upward from its in-use position (FIG. 12) via rotatable motion of slot 234 about pin 242, with pin 214 sliding along (or adjacent to) outer edge 238 of lower mounting portion 210, until pin 214 is positioned adjacent a mouth of slot 209. In this position, platform 202 is in a generally upright position. In one aspect, platform 202 is generally parallel to rear surface 35 of the vehicle frame, while in other aspects, the generally upright position is not exclusively limited to this generally parallel relation to rear surface 35 of the vehicle frame.

FIG. 15 is a side view of the embodiment of FIGS. 12-14, according to one embodiment of the invention, illustrating the platform 202 in a storage position. As shown in FIG. 15, platform 202 is moved inward with pin 214 of arm support 212 sliding into slot 209 of lower mounting portion 210, and with slot 234 of inner end portion 232 of arm support 212 sliding relative to pin 242. At the completion of this motion, pin 214 in slot 209 releasably secures platform in position adjacent to rear surface 35 of vehicle frame 31 with slot 234 and pin 242 providing an additional mechanism to maintain the position of platform 202. Accordingly, two simultaneous pin-in-slot movements of pin 214 and slot 209, and of pin 242 in slot 234, occur to secure platform 202 relative to rear surface 35 of the vehicle frame.

At any time desired by the operator, the platform is returned to the in-use position by pulling outer end 218 of platform 202 outward to slidably remove pin 214 from slot 209, with slot 234 of inner end portion 232 sliding relative to pin 242, until pin 214 exits slot 209. In this position, platform 202 is free to rotate downward to the in-use position shown in FIGS. 12-13, in which stop mechanism 250 supports inner end portion 232 of arm 212 at surface 240, and pin 214 limits inward/outward motion of platform 202 relative to the rear surface 35 of the vehicle frame.

In one aspect, in both the in-use position and the storage position, the securing pin 214 and latching slot 209 are laterally spaced further away from the rear surface 35 of the vehicle frame 31 relative to the pivot pin 242. In another aspect, in the in-use position, the securing pin 214 is positioned lower than the pivot pin 242, by virtue of angled inner end portion 232 of support arm 212, and in the storage position, the securing pin 214 is positioned vertically above the pivot pin 242.

This arrangement enables movement of only a single platform assembly (including platform 202, arm 212 including slot 234, and pin 214), relative to a mounting frame (including slot 209 and pin 242). In use, the first slot 234 remains both slidably and pivotally engaged to the second pin 242 while the first pin 214 is releasably slidable into the second slot 209 upon rotation of the entire platform 202. According, the platform assembly itself effectively acts as the only moving part to enable pivotal movement of platform 202 between the in-use and the storage position and to enable securing the platform 202 in the storage position.

In one aspect, platform system 200 uses the force of gravity to maintain the position of the platform 202. In the storage position, since the securing pin 214 and receiving slot 209 are above the pivot pin 242, and slot 209 is angled parallel to rear surface 35, once pin 214 is aligned within slot 209, gravity assists a user in pushing pin 214 into slot 209 and in maintaining pin 214 in slot 209. When released from the storage position by pulling platform 202 outward to remove pin 214 from slot 209, gravity tends to cause platform 202 rotate downward relative to pivot pin 242, with stop mechanism 250 preventing any further movement of platform 202. Accordingly, the arrangement of pins and slots of platform system 200 enables the natural force of gravity to facilitate positioning of platform 202 in its respective storage and in-use positions.

Figure 16:
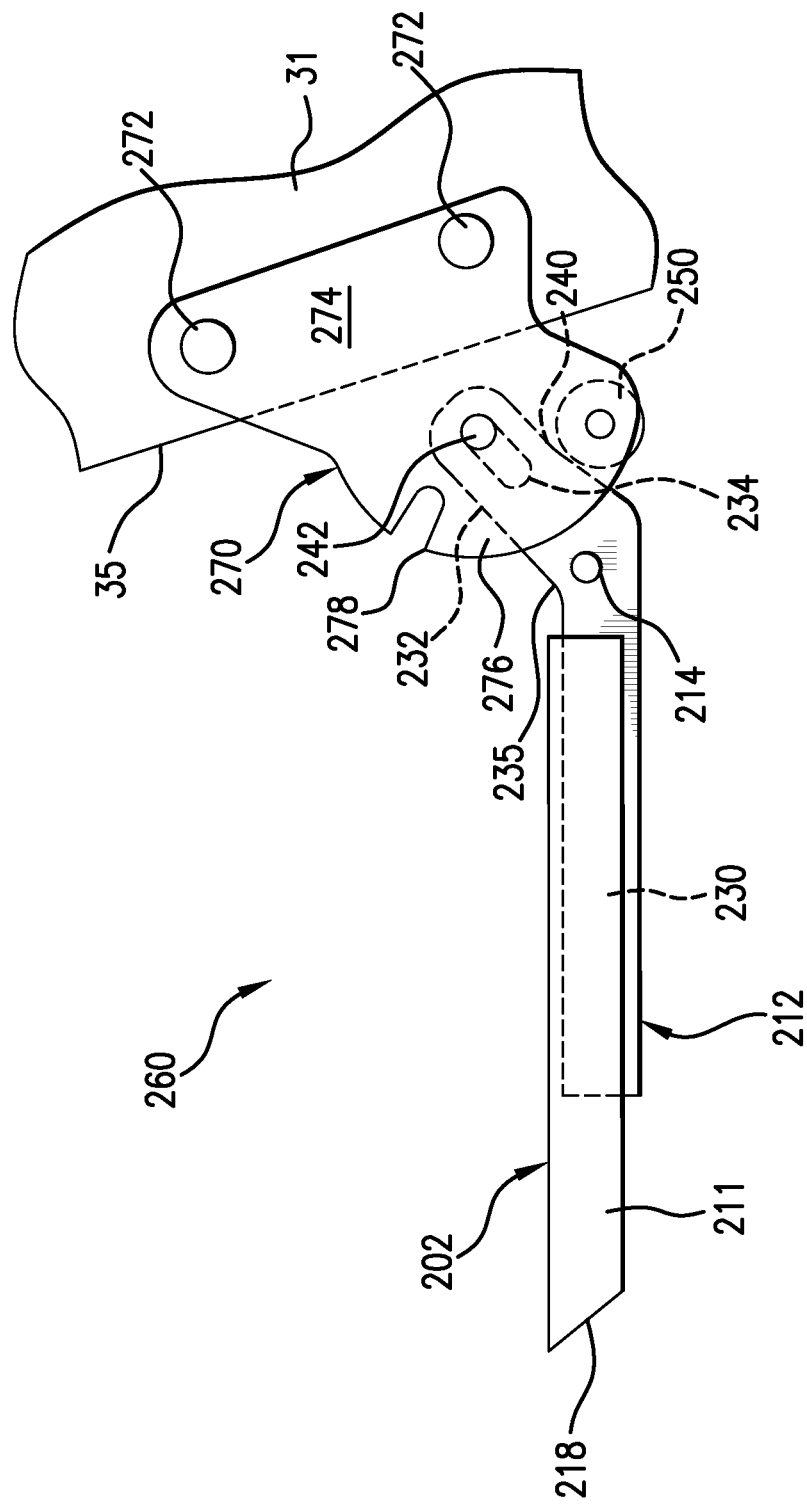
FIG. 16 is a side view of the rider platform of the embodiment of FIG. 12 in an in-use position with an alternative mounting frame, according to an embodiment of the present invention.

FIG. 16 is a side view illustrating a platform system 260 for a self-propelled vehicle (including platform 202 and pivot mechanism 204) having substantially the same features and attributes as platform system 200 of FIGS. 12-15, except replacing mounting frame 206 with mounting frame 270 to accommodate a different shape of vehicle frame. As shown in FIG. 15, pivot mechanism 204 is mounted to mounting frame 270. Mounting frame 270 is fixed to a side surface of a vehicle frame in contrast to mounting frame 206 which is fixed to rear surface 35 of vehicle frame 31 (FIGS. 12-15).

As shown in FIG. 16, mounting frame 270 comprises first body portion 274, holes 272 for mounting to vehicle frame 31, second body portion 276, and slot 278 (like slot 209 in FIGS. 12-15). First body portion 274 of mounting frame 270 is sized and shaped so that when fixed to a side surface adjacent rear surface 35 of a vehicle frame, pivot mechanism 204 is in a position close to, but spaced from, rear surface 35 of the vehicle frame to achieve the functions and features previously described for platform 202 in association with mounting frame 206 (FIGS. 12-15).

FIG. 17 is a perspective view illustrating a platform system 300, according to an embodiment of the invention. Platform system 300 comprises substantially the same features and attributes as platform systems (including a pivot mechanism and latch mechanism) described in association with FIGS. 1-16, except additionally including a shock-absorbing member 310 as shown in FIG. 17. Shock-absorbing member 310 establishes a link between platform 202 and rear surface 35 of vehicle frame 31 to minimize vibration that would otherwise be transmitted to an operator standing on platform. In one aspect, the shock absorbing link is a piston-cylinder arrangement (as shown) which provides a variable length to member 310 to facilitate pivotal movement of platform 202. In another aspect, the shock absorbing link is an elastomeric member. In other aspects, the shock absorbing link is a spring member or other dampening mechanism.

In addition, each end of member 310 is pivotally mounted relative to platform 202 and relative to rear surface 35 to enable pivoting of platform 202 between the previously described and illustrated in-use and storage positions of platform 202.

In another embodiment, platform system 300 omits a pivot mechanism (such as pivot mechanism 44) and a latch mechanism (such as latch mechanism 46) and relies solely on member 310 to provide a pivoting function for platform 202 and a latching function (via gas pressurization in a cylinder of member 310).

In one aspect, member 310 is mounted at a side of platform 202 as shown in FIG. 117 while in other aspects, member 310 is mounted adjacent a central region of platform between opposite sides of platform 202.

Embodiments of the present invention enable convertible use of self-propelled vehicles in either a walk-behind or ride-on-platform mode by simple pivotal movement of a platform between a generally horizontal position for riding operation and a generally upright, selectively engaged storage position for walk-behind operation. In one aspect, a pivot mechanism enables single hand use to simply flip the platform upward for storage and to flip the platform down for use. The platform can be built as part of the vehicle frame or attached later as a retro-fit assembly.

Although specific embodiments have been illustrated and described herein for purposes of description of the preferred embodiment, it will be appreciated by those of ordinary skill in the art that a wide variety of alternate and/or equivalent implementations may be substituted for the specific embodiments illustrated and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of supporting a rider behind a self-propelled mower, the method comprising:
    mounting, via a pivot mechanism, at least one support arm of a platform relative to a rear portion of the self-propelled mower to enable positioning the platform in a generally upright storage position to operate the mower in a walk-behind mode or positioning the platform in a generally horizontal position to operate the mower in a ride-on mode in which a user stands on the platform behind the mower;
    providing the walk-behind mode of operation of the mower via releasably maintaining the platform in a generally upright position adjacent to, and relative to, the rear portion of the mower via a hands-free releasable engagement of a position-maintaining mechanism relative to the rear portion of the mower, and including arranging the position-maintaining mechanism to be located on at least one of the rear portion of the mower and the at least one support arm; and providing the ride-on mode of operation of the mower, when the position-maintaining mechanism is disengaged, via preventing downward pivotal movement of the platform beyond a generally horizontal position by releasably supporting the platform relative to the rear portion of the mower frame, and including arranging a location of the releasable support of the platform to be spaced apart from, and independent of, the pivot mechanism; and switching between the walk-behind mode and the ride-on mode via selectively pivotally moving the platform, via a single-handed manipulation of an outer end of the platform, between the releasably securable generally upright position and the generally horizontal position.

2. The method of claim 1, wherein providing the ride-on mode of operation comprises:
interposing a vibration-absorbing element between the rear portion of the mower frame and the platform when the platform is in the generally horizontal position in the ride-on mode of operation.

3. The method of claim 2, wherein the vibration-absorbing element is made of an elastomeric material.

4. The method of claim 1, wherein arranging the position-maintaining mechanism to be located on the rear portion of the mower comprises:
interposing the position-maintaining mechanism between the rear portion of the mower and the at least one support arm.

5. The method of claim 1, wherein releasably supporting the platform relative to the rear portion of the mower frame comprises:
arranging a stop mechanism, on a mounting frame attached to the rear portion of the mower, to releasably engage an inner portion of the at least one support arm, wherein the stop mechanism is spaced apart from, and independent of, the pivot mechanism.

6. The method of claim 1 wherein switching between the walk-behind mode and the ride-on mode via the single-handed manipulation comprises:
additionally using a second hand, at the same time as the single hand, to perform the manipulation of the outer end of the platform.

7. A self-propelled vehicle comprising:
a frame including a rear portion, a front portion, and two side portions extending between the rear portion and the front portion;
a platform;
at least one support member having a first portion pivotally mounted to one of the side portions of the frame and a second portion coupled to the platform, wherein the first portion of the support member extends outwardly and forwardly from an inner end of the platform and wherein the platform is pivotally movable between:
a storage position in which the platform is arranged in proximity to the rear portion of the frame to permit walking behind the vehicle during operation of the vehicle; and
an in-use position in which the platform is releasably supported relative to the rear portion of the frame to inhibit pivotal movement of the platform downward beyond the generally horizontal orientation and to support the operator in an elevated position above the ground, and wherein the in-use position includes the inner end of the platform being spaced apart rearwardly from the location of pivotal mounting,
wherein a location of the pivotal mounting of the first portion is spaced apart from, and independent of, a location at which the platform is releasably supported relative to the rear portion of the frame when in the in-use position; and
a vibration-absorbing element interposed between the inner end of the platform and the rear portion of the frame when the platform is in the in-use position.

8. The self-propelled vehicle of claim 7, wherein the vibration-absorbing element is independent of the at least one support member.

9. The self-propelled vehicle of claim 7, wherein the vibration-absorbing element is made of an elastomeric material.

10. The self-propelled vehicle of claim 7, comprising:
a mounting frame attached to the rear portion of the frame and interposed between the rear portion of the frame and the platform, wherein the vibration-absorbing element is supported on the mounting frame and positioned to releasably engage an inner end of platform when the platform is in the in-use position.

11. The self-propelled vehicle of claim 7, wherein at least one support member comprises a pair of support members, with each respective support member disposed on opposite sides of the vehicle frame.

12. The self-propelled vehicle of claim 7, comprising:
a position-maintaining mechanism, associated with at least one of the support member and the platform, to releasably engage the frame to position the platform in the storage position.

13. A self-propelled vehicle comprising:
a frame including a rear portion, a front portion, and two side portions extending between the rear portion and the front portion;
a platform including at least one support member adjacent the rear portion of the frame and having a first portion pivotally mounted to one of the side portions of the frame and a second portion coupled to the platform, wherein the platform is pivotally movable between:
a storage position in which the platform is oriented in a generally upright position in proximity to the rear portion of the frame to permit operation of the mower while walking behind the vehicle; and
an in-use position in which the platform is releasably supported relative to the rear portion of the frame to inhibit pivotal movement of the platform downward beyond the generally horizontal orientation to support a pedestrian operator in an elevated position above the ground,
wherein a location of the pivotal mounting of the first portion is spaced apart from, and independent of, a location at which the platform is releasably supported relative to the rear portion of the frame when in the in-use position.

14. The self-propelled vehicle of claim 13, wherein the first portion of the support member extends outwardly and forwardly from an inner end of the platform, and when the platform is in the in-use position, the inner end of the platform is spaced apart rearwardly from the location of pivotal mounting.

15. The self-propelled vehicle of claim 13, comprising:
a vibration-absorbing element interposed between the inner end of the platform and the rear portion of the frame when the platform is in the in-use position, and wherein the vibration-absorbing element is independent of the at least one support member.

16. The self-propelled vehicle of claim 13, wherein at least one support member comprises a pair of support members, with each respective support member disposed on opposite sides of the vehicle frame.

17. The self-propelled vehicle of claim 13, comprising:
a position-maintaining mechanism, associated with at least one of the support member and the platform, to releasably engage the frame to position the platform in the storage position.

18. A self-propelled vehicle, the vehicle being shiftable between a walk-behind mode in which allows for unobstructed operation of the self-propelled vehicle by a pedestrian operator, and a ride-on mode in which the operator is supported and carried by the self-propelled vehicle during operation, the vehicle comprising:
a frame, the frame presenting a rear portion, a front portion, and two side portions extending between the rear portion and the front portion;
a stand-on rider platform pivotally mounted proximate the rear portion of the frame via at least one support member,
the at least one support member including—
a first portion pivotally mounted to one of the two side portions of the frame and extending generally parallel to the side portion of the frame, and
a second portion extending outwardly and rearwardly from the first portion of the at least one support member in a plane substantially parallel to the first portion,
wherein the second portion is coupled to the rider platform, thereby coupling the rider platform to the frame proximate to and spaced apart from the rear portion of the frame,
wherein the platform is pivotally shiftable with respect to the frame via the at least one support member between—
a storage position in which the rider platform is oriented in a position adjacent the rear portion of the frame and clear of the operator such that the self-propelled vehicle is in the walk-behind mode, and
an in-use position in which the rider platform extends in a generally horizontal orientation outwardly from the rear portion of the frame, and in which the rider platform is spaced above a ground surface to support the operator in an elevated position such that the self-propelled vehicle is in ride-on mode,
wherein the rider platform is releasably supported relative to the rear portion of the frame to inhibit pivotal movement of the rider platform downward beyond the generally horizontal orientation.

19. The vehicle of claim 18, wherein the at least one support member further includes:
a third portion pivotally mounted to the other of the two side portions of the frame and extending generally parallel to the side portion of the frame, and
a fourth portion extending outwardly and rearwardly from the third portion of the mounting member in a plane substantially parallel to the third portion,
wherein the fourth portion is coupled to the rider platform.

20. The vehicle of claim 18, comprising:
a vibration-absorbing element interposed between the platform and the rear portion of the frame when the platform is in the in-use position.

* * * * *